(12) United States Patent
Dicaire (10) Patent No.: US 9,938,714 B2
(45) Date of Patent: Apr. 10, 2018

(54) HINGED BUILDING SHRINKAGE COMPENSATION DEVICE

(71) Applicant: OMG, Inc., Agawam, MA (US)

(72) Inventor: Mark A. Dicaire, Northborough, MA (US)

(73) Assignee: OMG, Inc., Agawam, MA (US)

( * ) Notice: Subject to any disclaimer, the term of this patent is extended or adjusted under 35 U.S.C. 154(b) by 0 days.

(21) Appl. No.: 15/468,610

(22) Filed: Mar. 24, 2017

(65) Prior Publication Data

US 2017/0275874 A1    Sep. 28, 2017

Related U.S. Application Data

(60) Provisional application No. 62/312,514, filed on Mar. 24, 2016.

(51) Int. Cl.
| | | |
|---|---|---|
| *E04B 2/70* | (2006.01) | |
| *E04B 1/38* | (2006.01) | |
| *E04H 9/14* | (2006.01) | |
| *E04B 1/41* | (2006.01) | |

(52) U.S. Cl.
CPC .............. *E04B 2/706* (2013.01); *E04B 1/40* (2013.01); *E04H 9/14* (2013.01); *E04B 2103/04* (2013.01)

(58) Field of Classification Search
CPC ........ E04B 2/706; E04B 1/40; E04B 2103/04; E04H 9/14
See application file for complete search history.

(56) References Cited

U.S. PATENT DOCUMENTS

| | | | | |
|---|---|---|---|---|
| 2,299,323 | A * | 10/1942 | Hetky | E04G 3/26 182/121 |
| 2,587,792 | A * | 3/1952 | Von Sivers | A46D 1/00 15/207.2 |
| 2,625,368 | A * | 1/1953 | Warner | E04F 21/22 254/15 |
| 2,653,553 | A * | 9/1953 | Jacobs | A01G 9/14 52/639 |
| 2,708,462 | A * | 5/1955 | Frear | B31B 50/00 140/93 R |

(Continued)

FOREIGN PATENT DOCUMENTS

| | | | |
|---|---|---|---|
| CN | 205325456 U | * | 6/2016 |
| CN | 205954716 U | * | 2/2017 |

(Continued)

*Primary Examiner* — Jeanette E Chapman
(74) *Attorney, Agent, or Firm* — Alix, Yale & Ristas, LLP (57) ABSTRACT

A device for compensating for the natural shrinkage of building materials includes a hinged expander mounted on an elongate base plate. The base plate includes a plurality of spaced apart teeth on each longitudinal end that define a notch between each pair of adjacent spaced teeth. The hinged expander included two leafs that are joined at an apex in a hinged relationship. Each leaf has an outer edge configured for receipt within a notch in the base plate. Apex is biased in a direction away from the base plate. The teeth prevent outward movement of the leaf edges while permitting inward movement. The base plate is securely fastened to a first building member. A fastener is longitudinally fixed relative to a second building member and the apex of the hinged expander but not fixed longitudinally relative to the base plate and first building member.

18 Claims, 8 Drawing Sheets

(56) References Cited

U.S. PATENT DOCUMENTS

| | | | |
|---|---|---|---|
| 2,741,514 A * | 4/1956 | Fisher | E04F 21/1822 269/309 |
| 3,195,694 A * | 7/1965 | De Castro | E04H 9/14 52/263 |
| 3,691,712 A * | 9/1972 | Bowling | E04B 1/98 188/268 |
| 5,301,480 A * | 4/1994 | Oyama | E04F 15/02482 52/126.6 |
| 5,364,214 A | 11/1994 | Fazekas | |
| 5,522,688 A | 6/1996 | Reh | |
| 5,533,307 A * | 7/1996 | Tsai | E04H 9/021 52/167.1 |
| 5,535,561 A | 7/1996 | Schuyler | |
| 5,540,530 A | 7/1996 | Fazekas | |
| 5,588,270 A * | 12/1996 | Keating | E06B 3/485 160/201 |
| 5,815,999 A | 10/1998 | Williams | |
| 5,819,484 A * | 10/1998 | Kar | E04H 9/02 52/167.1 |
| 5,845,438 A * | 12/1998 | Haskell | E04H 9/02 52/167.1 |
| 5,880,374 A * | 3/1999 | MacKarvich | G01M 5/005 73/786 |
| 5,915,676 A * | 6/1999 | Abiru | E04H 9/02 188/134 |
| 6,161,350 A | 12/2000 | Espinosa | |
| 6,195,949 B1 | 3/2001 | Schuyler | |
| 6,224,521 B1 * | 5/2001 | Foucault | A63B 21/008 482/112 |
| 6,250,426 B1 * | 6/2001 | Lombard | B66F 11/04 182/146 |
| 6,390,747 B1 | 5/2002 | Commins | |
| 6,494,654 B2 | 12/2002 | Espinosa | |
| 6,560,940 B2 | 5/2003 | Mueller | |
| 6,585,469 B2 | 7/2003 | Commins | |
| 6,625,945 B2 | 9/2003 | Commins | |
| 6,672,573 B2 * | 1/2004 | Berton | E04H 9/02 267/136 |
| 6,688,058 B2 | 2/2004 | Espinosa | |
| 6,840,016 B1 * | 1/2005 | Mualla | E04H 9/02 52/167.1 |
| 6,892,504 B1 * | 5/2005 | diGirolamo | E04L 31/08 52/167.3 |
| 6,931,804 B2 * | 8/2005 | Trarup | E02D 27/32 52/167.3 |
| 6,951,078 B2 | 10/2005 | Espinosa | |
| 7,007,432 B2 | 3/2006 | Commins | |
| 7,017,312 B1 | 3/2006 | Mueller | |
| 7,037,060 B2 | 5/2006 | Commins | |
| 7,150,132 B2 | 12/2006 | Commins | |
| 7,159,366 B2 | 1/2007 | Espinosa | |
| 7,287,355 B2 | 10/2007 | Commins | |
| 7,340,867 B2 | 3/2008 | Espinosa | |
| 7,367,075 B2 * | 5/2008 | Kim | E01D 19/00 14/73.5 |
| 7,509,778 B2 | 3/2009 | Leek | |
| 7,516,582 B2 | 4/2009 | Leek | |
| 7,617,642 B2 | 11/2009 | Espinosa | |
| 7,621,085 B2 | 11/2009 | Commins | |
| 7,665,258 B2 | 2/2010 | Espinosa | |
| 7,748,180 B1 * | 7/2010 | Plavidal | E04L 35/12 52/223.11 |
| 7,752,824 B2 | 7/2010 | Brown et al. | |
| 7,762,030 B2 | 7/2010 | Espinosa | |
| 7,905,066 B2 | 3/2011 | Pryor et al. | |
| 7,971,411 B2 | 7/2011 | Commins | |
| 8,001,734 B2 * | 8/2011 | Pryor | E04B 1/2403 52/167.3 |
| 8,112,955 B2 | 2/2012 | Espinosa | |
| 8,136,318 B2 | 3/2012 | Espinosa | |
| 8,186,924 B1 | 5/2012 | Espinosa | |
| 8,276,323 B2 | 10/2012 | Gray et al. | |
| 8,511,019 B2 | 8/2013 | Espinosa | |
| 8,621,791 B2 * | 1/2014 | Mualla | E04B 1/98 52/167.3 |
| 8,656,650 B2 | 2/2014 | Gray et al. | |
| 8,677,699 B2 * | 3/2014 | Tagawa | E04H 9/021 188/380 |
| 8,844,244 B2 | 9/2014 | Gray et al. | |
| 8,857,110 B2 * | 10/2014 | Constantinou | E04H 9/02 52/167.2 |
| 8,881,478 B2 | 11/2014 | Gray et al. | |
| 9,080,339 B2 * | 7/2015 | Hayes | F16B 7/00 |
| 9,097,000 B2 | 8/2015 | Espinosa | |
| 9,206,616 B2 * | 12/2015 | Sarlis | E04H 9/021 |
| 9,580,924 B1 * | 2/2017 | Taylor | E04H 9/028 |
| 9,587,401 B1 * | 3/2017 | Benton | E04C 3/02 |
| 2001/0045069 A1 * | 11/2001 | Constantinou | E04H 9/02 52/167.3 |
| 2002/0129568 A1 * | 9/2002 | Oka | E04H 9/02 52/167.3 |
| 2003/0230032 A1 * | 12/2003 | Shahnazarian | E04H 9/14 52/167.3 |
| 2004/0107654 A1 * | 6/2004 | Powell | E04H 9/02 52/167.3 |
| 2005/0284057 A1 | 12/2005 | Commins | |
| 2006/0133912 A1 | 6/2006 | Commins | |
| 2006/0269364 A1 * | 11/2006 | May | E02D 5/56 405/232 |
| 2008/0060296 A1 | 3/2008 | Espinosa | |
| 2012/0304589 A1 | 12/2012 | Commins | |
| 2015/0184413 A1 * | 7/2015 | Pryor | E04H 9/021 52/167.3 |
| 2017/0145686 A1 * | 5/2017 | Lee | E04B 1/98 |

FOREIGN PATENT DOCUMENTS

| | | | | |
|---|---|---|---|---|
| CN | 107044123 A | * | 8/2017 | |
| EP | 0516314 A2 | * | 12/1992 | B66F 3/12 |
| EP | 0808965 A2 | * | 11/1997 | E04G 15/00 |
| GB | 1133315 A | * | 11/1968 | E04G 21/16 |
| JP | 2012062928 A | * | 3/2012 | |

* cited by examiner

HINGED BUILDING SHRINKAGE COMPENSATION DEVICE

CROSS-REFERENCE TO RELATED APPLICATION

This application claims priority to U.S. Provisional Application No. 62/312,514, filed Mar. 24, 2016, the entire content of which is hereby incorporated by reference.

BACKGROUND

The disclosure relates generally to building structures, and more particularly to shrinkage compensation devices for building structures having wooden frames.

In wood constructions, such as residences and smaller commercial buildings or hotels, the wood construction material naturally shrinks slightly over time. Shrinkage in lumber occurs as the moisture in the wood members evaporates causing the wood materials to constrict. Since only the wooden materials shrink (not fasteners or other metal components), the shrinkage of the building materials and the heavy load weight of building materials can result in an undesirable extra vertical clearance between levels and an overall loose structure. This phenomenon commonly causes the building to be susceptible to damage from uplift due to high winds or similar external forces. Thus, building compensation devices exist to restrain the building materials and prevent uplift. A typical system includes a series of elements: connectors at the roof to top of a wall, top of a wall to vertical studs, vertical studs between adjacent floors and to the foundation. In order to counteract upward loads from winds, the framing members may be anchored to the surface on which they are supported. On the ground level, anchor rods are typically sunk into a concrete foundation, and the bottom plate of the wall is bolted to the anchor rods. For levels built on top of the first level, straps or elongate fasteners are often used to anchor an upper level to the level below.

While effective at anchoring upper levels to lower levels, coil straps have certain drawbacks, including being positioned on the exterior of a framed construction, requiring alignment of vertical studs on adjacent floors Shrinkage in lumber occurs as the moisture in the wood members evaporates causing the members to constrict. This constriction may result in buckling or bowing outward of the strap, as well as any siding or exterior covering of the framed construction.

Compensation or take-up devices exist that allow a screw or similar elongate fastener to travel in one direction relative to a building level, while preventing the screw from traveling in the other direction exist for this reason. In practice, for example, a compensation device having a plate or similar element may be attached to the frame of an upper level of a building structure. An elongate fastener may be driven through the upper level frame with the distal end secured to the frame in the lower level. The compensation device in this example would allow the proximal end of the fastener (head) to travel upward relative to the top level frame, but prevent it from moving in the opposite direction.

Shrinkage compensation devices are shown and described in the art, including devices that mechanically engage with threads in the proximal portion of the elongate fastener to maintain the fastener with a ratchet engagement. Other devices exist that employ a torsion spring that biases two threaded members in opposite rotational directions so that the device can expand but not contract, or vice versa, depending on the position within the building frame structure. These known devices carry several drawbacks, including that the required firm mechanical metal-on-metal contact with the threads in the former example provides resistance in the direction of travel and can leave the threading vulnerable to stripping, as well as the strength of the ratchet engagement being limited by the shallowness of the threading. The rotationally biased devices can be prone to malfunction due to complexity and typically require several distinct steps during installation, making them inconvenient. Thus, there is a need for a building shrinkage compensation device that is easy to install and reduces or omits all of the aforementioned drawbacks.

SUMMARY

In an embodiment, a building shrinkage compensation device has an elongate base plate, a hinged expander and a bias member. The elongate base plate extends laterally from a first end to a second end. Both the first end and second end have a series of space teeth. The base plate defines a hole laterally between the opposite ends. The hinged expander includes a first leave and a second leaf. The first leaf has a first outer edge positioned between adjacent teeth in the base plate first end and the second leaf has a second outer edge positioned between adjacent teeth in the base plate second end. The first and second leafs are attached to each other at an apex opposite the outer edges in a hinged relationship. The apex defines an opening substantially laterally aligned with the base plate opening. The bias member biases the apex of the hinged expander away from the base plate.

In another embodiment, a building frame structure has a first level vertically spaced from a second level. A shrinkage compensation device includes an elongate base plate and a hinged expander. The base plate extends laterally from a first end with a series of spaced teeth to a second end with a series of spaced teeth, and defines a hole laterally between opposite ends. The base plate is secured to the first level. A hinged expander has a first leaf with a first outer edge and second leaf with a second outer edge. The expander is mounted on the base plate with the first outer edge positioned between adjacent teeth in the base plate second end and the second outer edge positioned between adjacent teeth in the base plate second end. The first and second leafs are attaché to each other at an apex opposite the outer edges in a hinged relationship. The apex defines an opening substantially laterally aligned with the base plate opening. A bias member biases the apex of the hinged expander away from the base plate. An elongate fastener has a shank with a circumferential flange at a proximal position. The fastener is positioned with the shank extending through the hinged expander opening, base plate and top level with a distal portion securely engaged with the lower level and the flange tightly abutting the apex of the hinged expander.

BRIEF DESCRIPTION OF THE DRAWINGS

Aspects of the preferred embodiment will be described in reference to the drawings, where like numerals reflect like elements.

DETAILED DESCRIPTION

Among the benefits and improvements disclosed herein, other objects and advantages of the disclosed embodiments will become apparent from the following wherein like numerals represent like parts throughout the several figures. Detailed embodiments of a hinged building shrinkage compensation device are disclosed; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. The phrases "in another embodiment" and "in some other embodiments" as used herein do not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on.

Further, the terms "substantial," "substantially," "similar," "similarly," "analogous," "analogously," "approximate," "approximately," and any combination thereof mean that differences between compared features or characteristics is less than 25% of the respective values/magnitudes in which the compared features or characteristics are measured and/or defined.

With reference to the Figures, disclosed herein is a ratcheted building shrinkage compensation device 10 having an elongate base plate 12 and a hinged expander 14. The base plate 12 has a plurality of spaced notches defined between a series of teeth 16 on opposite lateral ends. As shown, the hinged expander 14 is mounted on the base plate 12 with opposite edges 18a and 18b configured to engage within a notch on the respective lateral ends of the base plate. An expanded spring 20 extends between opposite ends of the hinged expander 14 and is connected to each leaf (14a and 14b) of the expander 14 to provide moderate inward biasing forces on each lateral end 18a and 18b of the of the expander 14. Shown best in FIGS. 2 and 3, the base plate 12 defines a hole 21 in its body intermediate the respective series of teeth 16. The hinged expander also defines a hole 22 at its apex between the respective leafs 14a and 14b. The expander 14 is mounted on the base plate 12 with the holes (21 and 22) aligned, thereby defining a passage for attachment of a take-up fastener 24 (i.e., screw or similar).

Reference numeral 26 represents a generally flat or horizontal upper level of a building structure (frame or similar). Typically, the hinged expander 14 is initially mounted in its collapsed position on base plate 12 (i.e., with opposite leaf edges 18a and 18b engaged in an outer notch). Notably, in the collapsed position of the expander 14, the tension spring 20 is actually extended or expanded with a higher degree of tension biasing the respective leafs 14a and 14b inward. The compensation device is secured to the surface of the upper level 26 via compressive forces of the proximal head 28 of the take-up fastener 24, with the distal end of the fastener 24 secured to the lower building level 27. As shown, the fastener 24 is positioned extending through the passage defined by the holes (21 and 22) in the apex of the hinged expander 14 and the base plate 12, and driven through the upper level 26 and into the lower level 27 of the building frame, securing the upper level to the lower level (see full structure FIG. 9) with the compensation device 10 compressed between the fastener head 28 and the upper level 26. As shown, a flange 25 near the proximal head 28 of the take-up fastener tightly abuts the edges of the hole 22 of the hinged expander 14 when installed. At least a proximal portion of the shank of the take-up fastener 24 is unthreaded such that there is no threaded engagement between the take-up fastener 24 and any of the base plate 12, hinged expander 14 and the upper level plank 26 (i.e., the proximal portion of the take-up fastener shank may pass freely through these elements). As shown in the representative structure FIG. 9, the take-up fastener 24 has threading 30 toward the distal end of the shank to engage securely into the lower level plank 27. That is, the take-up fastener 24 and lower level plank 27 are rigidly attached at installation, while the take-up fastener 24 is longitudinally reciprocable relative to the upper level plank 26.

Once installed, the tension spring 20 provides an inward bias on the outer edges 18a and 18b of the leafs 14a and 14b, which in turn biases the head 28 of the take-up fastener longitudinally upward relative to the upper level 26 and attached base plate 12. The upward bias on the take-up fastener head and secure attachment of the take-up fastener to the lower level plank 27 results in a relative bias on the upper level plank 26 and lower level plank 27 toward each other. While the tension spring 20 biases the opposite outer edges 18a and 18b of the leafs 14a and 14b inward, the surfaces and configuration of the notches and teeth 16 are such that outward movement of the edges 18a and 18b is prevented (i.e., only inward movement of the outer edges is permitted, thereby preventing further collapsing of the expander and take-up fastener head). As a result, the upper and lower levels can only be tightened relative to one another.

As described above, over time, wood building materials may undergo natural shrinkage and constriction due to moisture loss, and settlement due to the weight of the materials. As shrinkage occurs, the upward bias on the take-up fastener head 28 keeps the upper level and lower level building materials in a tight arrangement relative to one another, resisting any upward loads on the building (from high winds, for example). The hinged expander 14 is allowed to "expand" upward via inward spring bias on the leaf edges 18a and 18b to maintain a tight system, while also being mechanically prevented from collapsing (by outward movement of the leaf edges 18a and 18b). Once the wood materials shrink enough that one or both of the leaf edges 18a and 18b pass from a notch inwardly over a tooth 16, the edges are maintained in the adjacent notch and prevented from moving outward again. In this manner, the shrinkage compensation device 10 allows one-way motion of the base plate 12 and secured top level plank 26 relative to take-up fastener 24 and lower level 27 to compensate for the shrinkage of the wooden building materials to maintain the building structure in a tight arrangement. This one-way motion allows the wood building materials to constrict and the take-up fastener 24 to "take up" the lower level 27 relative to the upper level 26, while preventing upward movement of the building materials under an upward force. The disclosed shrinkage compensation device 10 may be used to attach subsequent levels in a building structure to the adjacent level below; the device and described methods are not limited to a two-level structure. Furthermore, as skilled artisans will readily appreciate, the positioning of the expander 10 on the top surface of an upper level can be reversed to a bottom fastener driven upward into the upper level.

The disclosed shrinkage compensation device 10 provides a simple installation and improved performance over known devices due to free passage of the proximal portion of the shank of the take-up fastener through the upper level plank and hole 21 in the base plate 12 (i.e., an absence of a metal-on-metal engagement with a take-up fastener threading during operation). In this manner, the compensation device 10 allows the proximal portion of the take-up fastener to travel freely upward relative to the upper level 26 as the wood building material shrinks.

In an alternate embodiment, not depicted herein, the laterally-extended tension spring 20 is replaced by a bias member positioned between the base plate 12 and hinged expander 14 directly biasing the apex of the hinge upward. The bias member in this embodiment can be, for example, a compressed spring or another elastic material.

Figure 1:
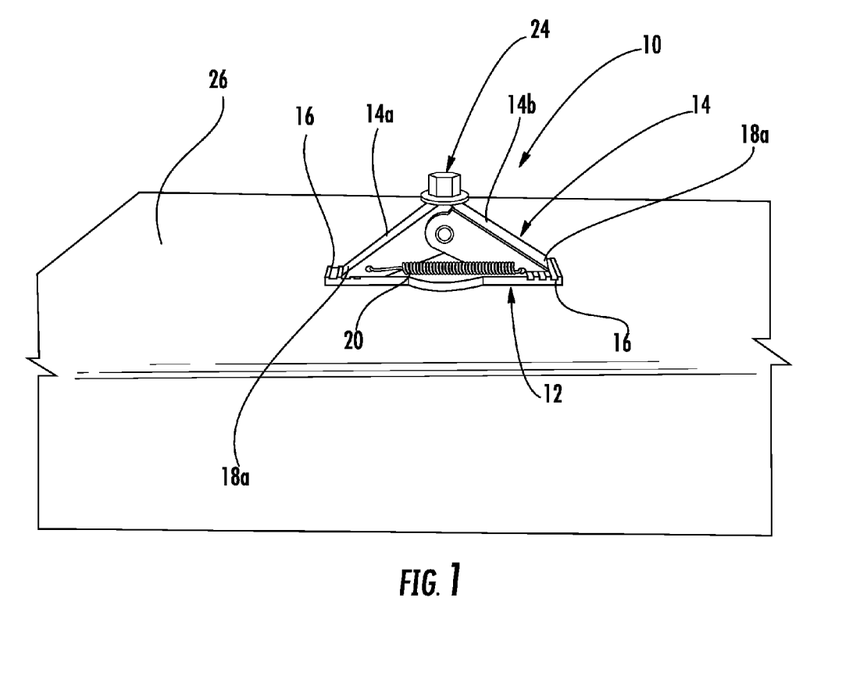
FIG. 1 depicts an embodiment of the building shrinkage compensation device installed on an upper level board in a collapsed position.
Figure 2:
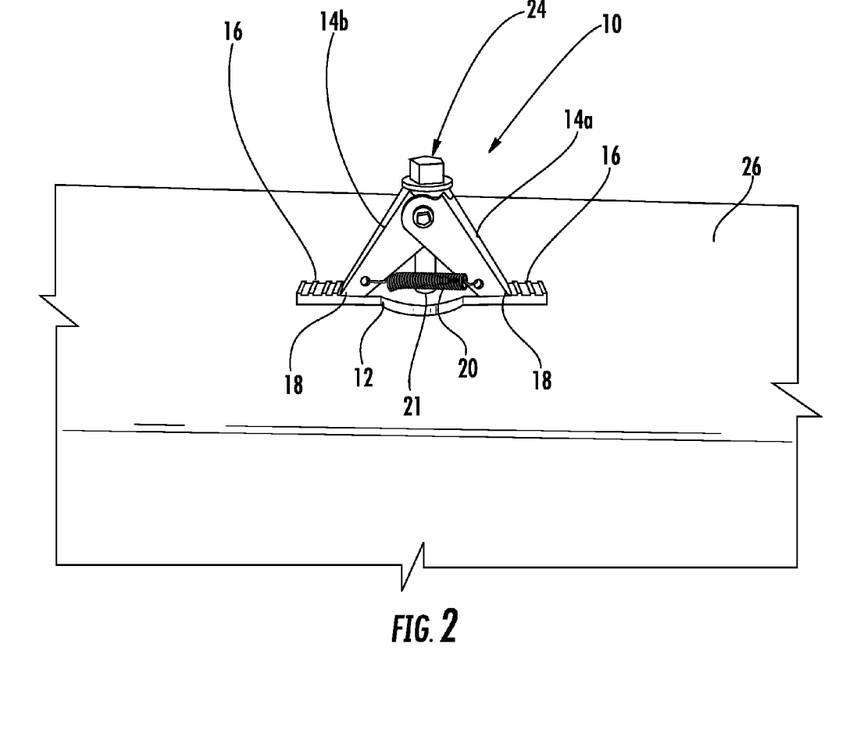
FIG. 2 depicts the compensation device of FIG. 1 in an expanded position.
Figure 3:
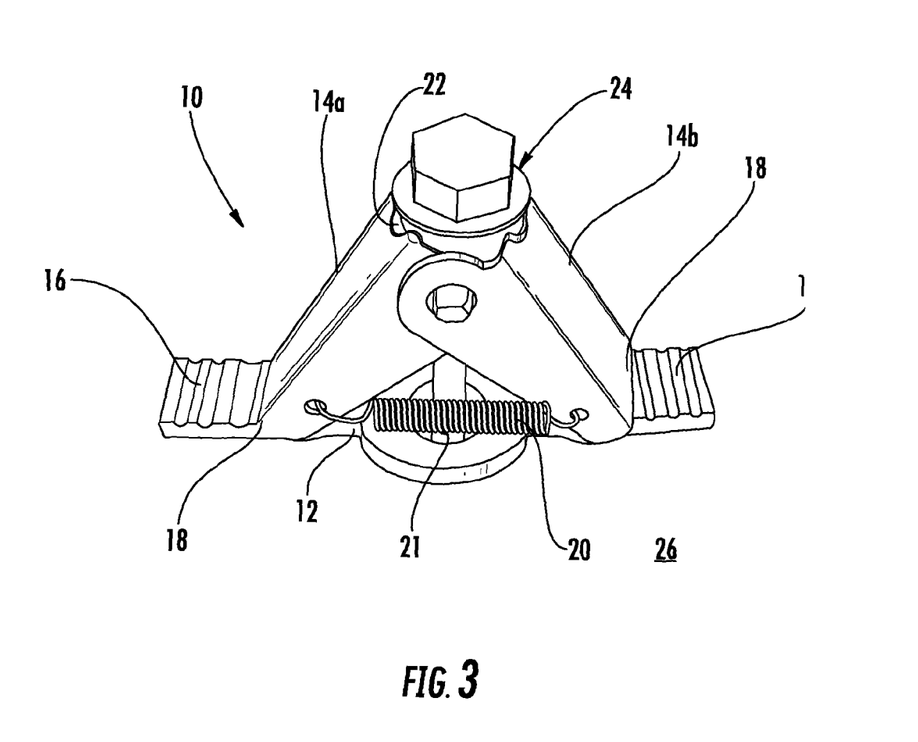
FIG. 3 is an enlarged view of the expanded compensation device of FIG. 2 from a different angle.

Generally, FIG. 1 depicts the device 10 with the hinged expander 14 in an initial collapsed position with outer leaf edges 18 in outer grooves in the base plate 12. The depiction of FIG. 1 represents the typical configuration at the point of initial installation of the device 10. FIG. 2 depicts the device 10 after shrinkage of the building materials has occurred and the spring 20 has contracted the outer leaf edges 18a and 18b inward causing upward movement of the apex of the hinged expander 14 and head 28 of the take-up fastener 24 relative to the base plate 12 and upper level plank 26. As shown, the edges 18a and 18b are maintained in base plate grooves that are inward of the grooves that maintained the edges initially and the expander apex and take-up fastener head are raised from the base plate and upper level plank. FIG. 3 is an enlarged view of the FIG. 2 condition from a different view, showing the tension spring 20, teeth 16 and intermediate grooves in greater detail.

Figure 4:
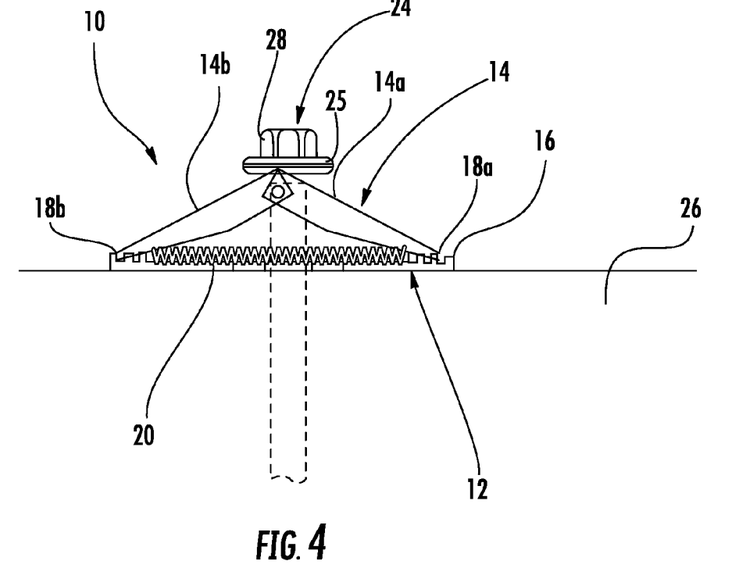
FIG. 4 is a side elevation view of an embodiment of the compensation device in a collapsed position at initial install.

FIG. 4 shows an embodiment of the shrinkage compensation device 10 with the hinged expander 14 in the collapsed position just after installation. The spring 20 attached to the opposite leafs 14a and 14b is stretched and under tension and the outer edges 18a and 18b of the leafs 14a and 14b are locked by outer teeth 16.

Figure 5:
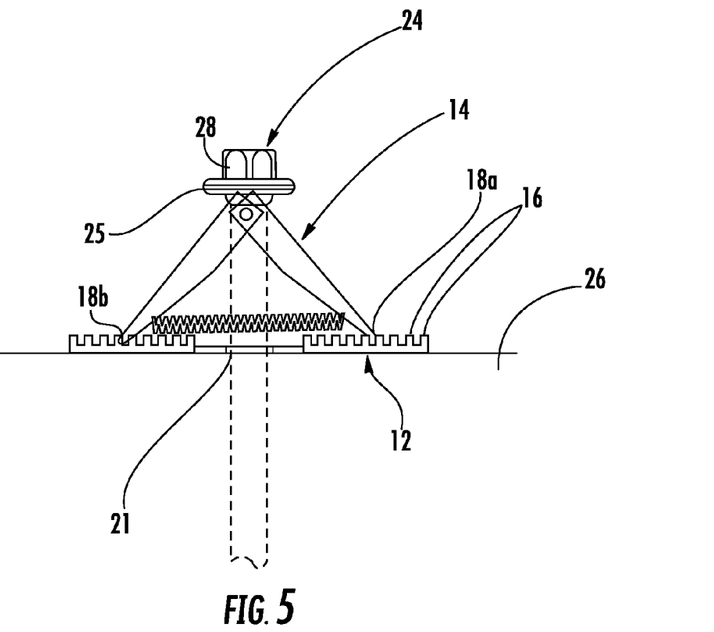
FIG. 5 is a side elevation view of the device of FIG. 4 in an expanded position after shrinkage of building materials.

FIG. 5 shows the shrinkage compensation device 10 after shrinkage of building materials with the expander 14 in an upwardly expanded position and greater clearance between the fastener head 28 and upper level plank 26. The spring 20 has contracted relative to its position in FIG. 4, thereby drawing the leafs 14a and 14b inward and pushing the apex of the hinged expander 14 upward and raising the take-up fastener 24 relative to the top level 26 to compensate for the natural shrinkage of the building material. The outer edges 18a and 18b of the respective leafs 14a and 14b are locked by teeth positioned inward of teeth locking the edges in the collapsed position (FIG. 4).

Figure 6:
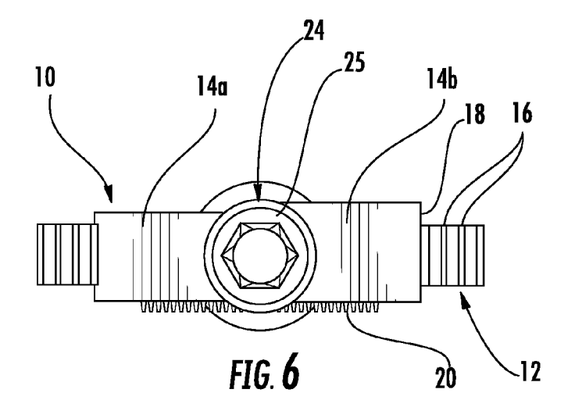
FIG. 6 is a top elevation view of the device of FIG. 5.
Figure 7:
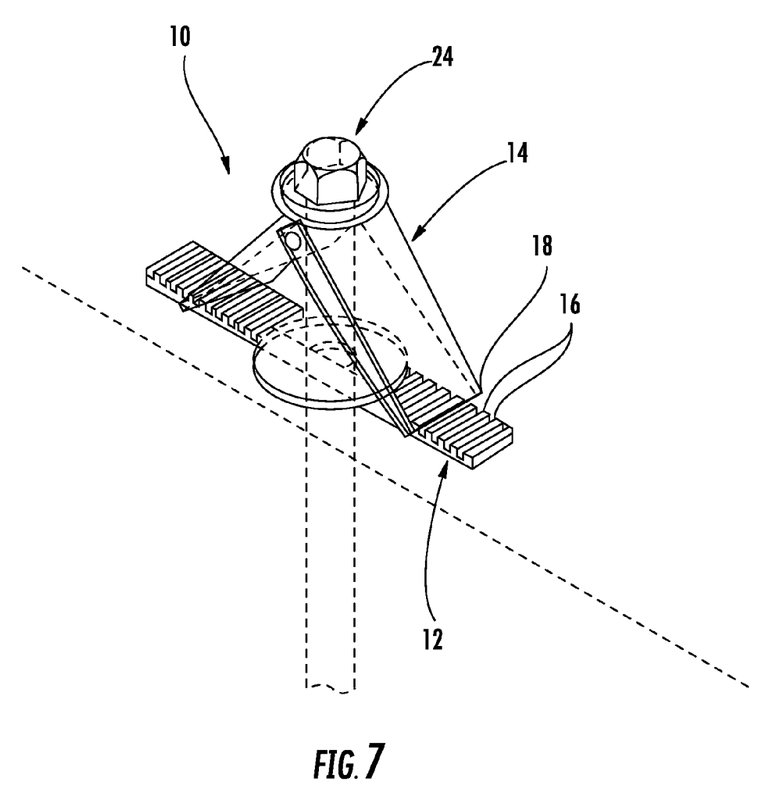
FIG. 7 is an isometric perspective view of the device of FIG. 5.

FIG. 6 is a top view of the compensation device 10 in the expanded configuration shown in FIG. 5. FIG. 7 shows an isometric view of the compensation device 10 in the expanded configuration shown in FIG. 5.

Figure 8:
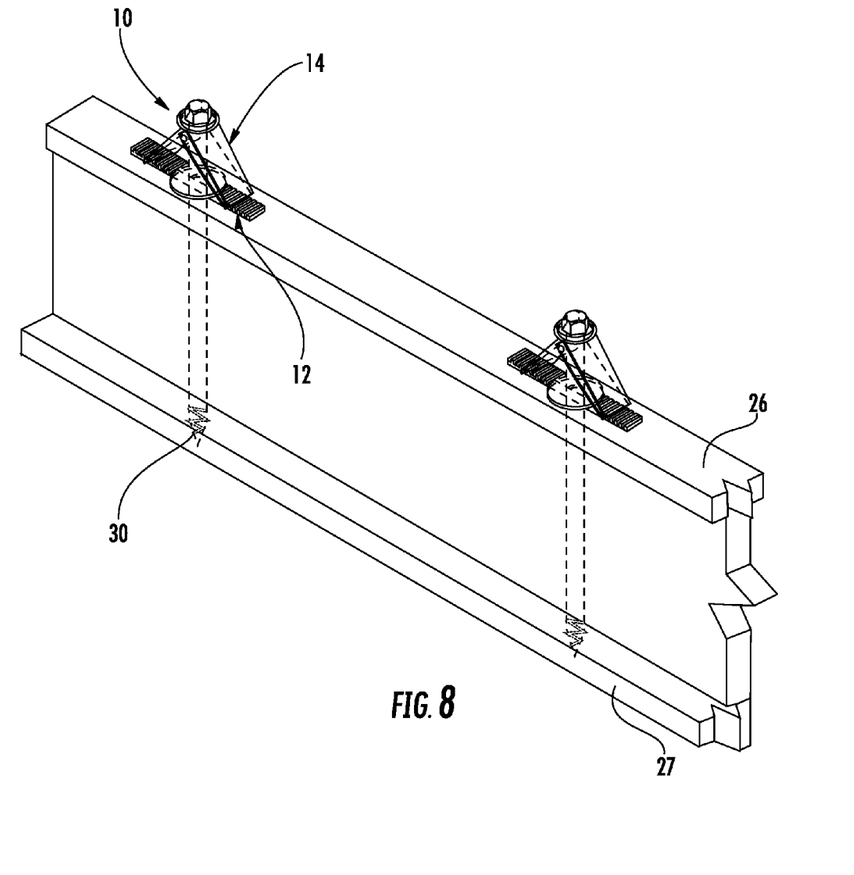
FIG. 8 depicts a representative building structure with the disclosed compensation device installed in its initial collapsed position.

FIG. 8 shows a representative building structure with the compensation device 10 in the raised/expanded position (like in FIGS. 2 and 5). When initially installed, the take-up fastener 24 is driven through the passage defined by the holes in the apex of the hinged expander 14 and the base plate 12 through the upper level board 26 and into the lower level 27 (representative elements may not be drawn to scale).

Preferred embodiments of the base plate 12 are made from galvanized steel of around 10-gauge thickness having a length between approximately 1.5 and 5 inches. Larger devices for use with rod securement can be up to 12 inches long. Preferred embodiments of the hinged expander 14 are made from galvanized steel of approximately 14-20 gauge thickness.

In a typical building structure, shrinkage compensation devices 10 are secured to respective upper level frames in the manner described above approximately 6-60 inches apart. In some areas of building structures, like near a corner post, it may be desirable to secure two compensation devices right next to each other, for example, at approximately 2 inches apart off-center. Of course, all of the preferred materials, dimensions and installation characteristics disclosed herein are non-limiting to the inventive concept.

Figure 9:
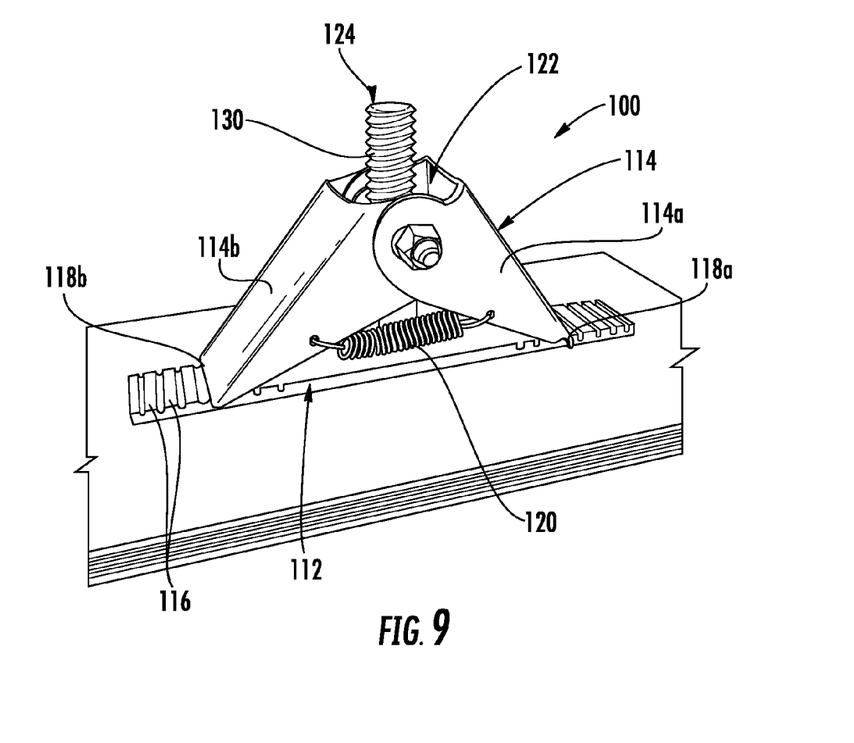
FIG. 9 shows another embodiment of the disclosed hinged building shrinkage compensation device.
Figure 10:
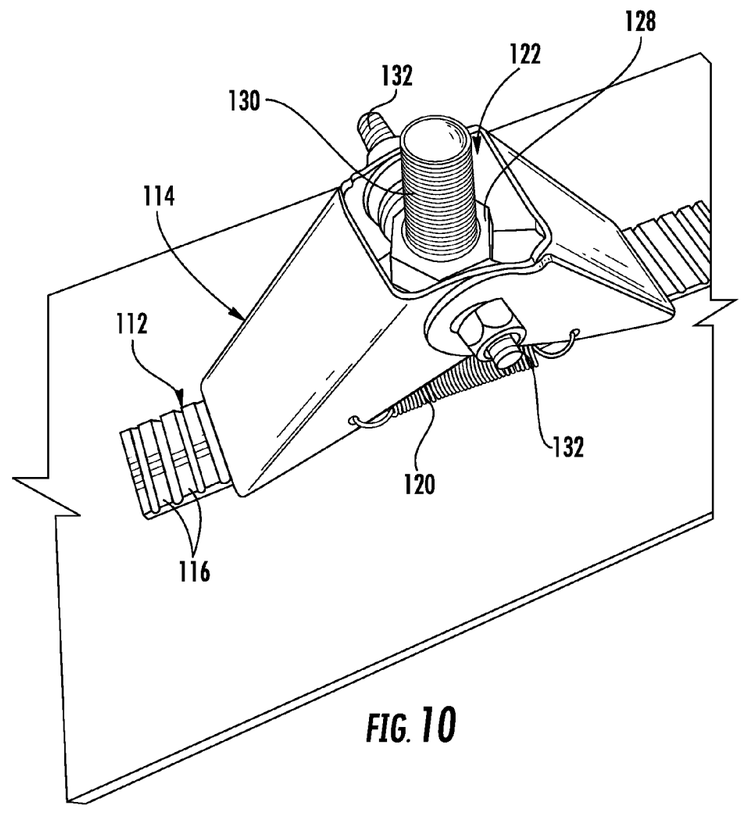
FIG. 10 shows another view of the device of FIG. 9.

With reference to FIG. 9, another embodiment of a hinged building shrinkage device 100 is disclosed. In most respects, the device 100 includes the similar elements and relationships, and operates in a similar way as compared to the prior embodiment of the device 10. The device 100 includes an elongate base member 112 with a series of spaced teeth 116 on each of the opposite lateral ends. A hinged expander 114 with cooperative leafs 114a and 114b is mounted on the base member 112 with outer edges 118a and 118b of the leafs configured to engage with a notch between adjacent teeth 116. An expanded compression spring 120 is attached to opposite leafs 114a and 114b biasing them toward one another. An opening 122 is defined in the apex portion of the hinged expander 114 between the respective leafs.

In this embodiment, a takeup fastener 124 has a threaded outer surface 130 at least proximate an upper end. An inner nut 128 is fastened to the hinge leafs 114a and 114b via a pair of cross bolts 132, and defines a threaded bore to engage with the threads 130 in the takeup fastener 124. The hinged expander 114 is brought to its expanded position via rotation around the threads 130 of the takeup fastener in the direction to draw the apex of the expander 114 downward until the device is tightened with outer edges 118a and 118b of the leafs 114a and 114b within a notch of the base member 112. Once the device 100 is tightened in a collapsed position, it operates just like the embodiment of the device 10. As building materials shrink, the inward bias on the opposite leafs 114a and 114b via the spring 120 biases the apex portion of the expander 114 upward. Instead of biasing the takeup fastener upward via abutting with a head (like the head 28 of the previous embodiment), the take-up fastener 124 is continuously biased upward via the threaded engagement between inner nut 128 and threads 130.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A building shrinkage compensation device, comprising:
   an elongate base plate extending laterally from a first end with a series of spaced teeth to a second end with a series of spaced teeth and defining a hole laterally between the opposite ends,
   a hinged expander with a first leaf with a first outer edge positioned between adjacent teeth in the base plate first end and a second leaf with a second outer edge positioned between adjacent teeth in the base plate second end, the first and second leafs being attached to each other at an apex opposite the outer edges in a hinged relationship, the apex defining an opening substantially laterally aligned with the base plate opening; and
   a bias member biasing the apex of the hinged expander away from the base plate.

2. The building shrinkage compensation device of claim 1, wherein the bias member biases the first outer edge and second outer edge of the hinged expander inward, thereby biasing the apex away from the base plate.

3. The building shrinkage compensation device of claim 2, wherein the bias member is an expanded spring expanded between the first outer edge and the second outer edge to bias the respective edges laterally inward.

4. The building shrinkage compensation device of claim 1, wherein the bias member is a compressed spring positioned between the base plate and the expander apex to bias the apex away from the base plate.

5. The building shrinkage compensation device of claim 1, comprising an elongate fastener with a shank extending through the hole in the base plate, wherein the shank is longitudinally fixed relative to the apex of the hinged expander and not longitudinally fixed relative to the base plate.

6. The building shrinkage compensation device of claim 5, wherein the base plate is longitudinally fixed relative to a first building member and the shank is fixed relative to a second building member.

7. The building shrinkage compensation device of claim 6, wherein the shank is threaded at a distal portion for securely fastening to the second building member.

8. The building shrinkage compensation device of claim 1, wherein the hinged expander defines an opening proximate the apex between the first leaf and second leaf.

9. The building shrinkage compensation device of claim 8, wherein the opening in the hinged expander is substantially aligned with the hole in the base plate.

10. The building shrinkage compensation device of claim 9, comprising an elongate fastener with a shank extending from a head, wherein the shank extends through the opening in the hinged expander and the hole in the base plate with the head abutting an edge defined by the hinged expander opening.

11. The building shrinkage device of claim 10, wherein at least a portion of the fastener shank is threaded for secure attachment to a building frame member.

12. The building shrinkage device of claim 1, wherein adjacent pair of spaced teeth on each end of the base plate define a notch between them receipt of the first edge or second edge channel.

13. The building shrinkage device of claim 12, wherein the teeth permit inward movement while preventing outward movement of the first edge and second edge of the hinged expander.

14. A building frame structure, comprising:
    a first level longitudinally displaced from a second level;
    a shrinkage compensation device comprising:
        an elongate base plate extending laterally from a first end with a series of spaced teeth to a second end with a series of spaced teeth and defining a hole laterally between the opposite ends, the base plate being secured to the first level;
        a hinged expander mounted on the base plate and having a first leaf with a first outer edge positioned between adjacent teeth in the base plate first end and a second leaf with a second outer edge positioned between adjacent teeth in the base plate second end, the first and second leafs being attached to each other at an apex opposite the outer edges in a hinged relationship, the apex defining an opening substantially laterally aligned with the base plate opening; and
        a bias member biasing the apex of the hinged expander away from the base plate; and
    an elongate fastener with a shank extending through the hole in the base plate and passing freely through the first level, wherein the shank is longitudinally fixed relative to the apex of the hinged expander and not longitudinally fixed relative to the base plate or first level.

15. The building frame structure of claim 14, wherein the fastener has a circumferential flange at a proximal position, and the fastener is positioned with the shank extending through the hinged expander opening, base plate and first level with a distal portion securely engaged with the second level and the flange tightly abutting the apex of the hinged expander.

16. The building frame structure of claim 14, wherein the fastener shank is unthreaded at a proximal portion, thereby allowing free movement of the shank relative to the base plate and first level.

17. The building frame structure of claim 14, wherein the bias member is a tension spring extending between the opposite leafs biasing the first and second edges inward.

18. The building frame structure of claim 14, wherein the fastener is threaded at a distal portion, the threaded distal portion being threadedly engaged with the second level.

* * * * *